US011722291B1

(12) United States Patent
Ho et al.

(10) Patent No.: US 11,722,291 B1
(45) Date of Patent: Aug. 8, 2023

(54) DEVICE AND METHOD FOR LOW-LATENCY AND ENCRYPTED HARDWARE LAYER COMMUNICATION

(71) Applicant: CADENCE DESIGN SYSTEMS, INC., San Jose, CA (US)

(72) Inventors: Steven Ho, Glasgow (GB); Gopi Krishnamurthy, Bangalore (IN); Anish Mathew, Bengaluru (IN)

(73) Assignee: Cadence Design Systems, Inc., San Jose, CA (US)

( * ) Notice: Subject to any disclaimer, the term of this patent is extended or adjusted under 35 U.S.C. 154(b) by 24 days.

(21) Appl. No.: 17/399,953

(22) Filed: Aug. 11, 2021

(51) Int. Cl.
*H04L 9/06* (2006.01)
*H04L 9/08* (2006.01)

(52) U.S. Cl.
CPC ............ *H04L 9/0618* (2013.01); *H04L 9/065* (2013.01); *H04L 9/0816* (2013.01); *H04L 9/0869* (2013.01)

(58) Field of Classification Search
CPC ..... H04L 9/0618; H04L 9/065; H04L 9/0816; H04L 9/0869
See application file for complete search history.

(56) References Cited

U.S. PATENT DOCUMENTS

| | | | | |
|---|---|---|---|---|
| 2010/0027781 A1* | 2/2010 | Galbi | .................... | H04L 9/0625 380/28 |
| 2013/0136256 A1* | 5/2013 | Relyea | .................. | H04L 9/0637 380/28 |
| 2016/0062920 A1* | 3/2016 | Hars | ..................... | H04L 9/0618 713/193 |
| 2018/0097630 A1* | 4/2018 | Suresh | .................... | G06F 7/724 |
| 2021/0051020 A1* | 2/2021 | Chen | ..................... | H04L 9/3242 |
| 2021/0389875 A1* | 12/2021 | Segev | ................... | G06F 3/0619 |
| 2022/0158819 A1* | 5/2022 | Salman | .................... | H04K 1/00 |

OTHER PUBLICATIONS

A new secure stream cipher for scan chain encryption, by Silva et al., published 2018 (Year: 2018).*

* cited by examiner

*Primary Examiner* — Vu V Tran
(74) *Attorney, Agent, or Firm* — Foley & Lardner LLP (57) ABSTRACT

A method of low-latency and encrypted hardware layer communication includes calculating, by an encryption circuit of a communication bridge controller, a pre-calculated encryption keys corresponding to a block encryptor of the encryption circuit, each block encryptor configured to use a corresponding pre-calculated encryption key to encrypt a corresponding unencrypted data block of a data transmission having one or more unencrypted data blocks, storing the one or more pre-calculated encryption keys in an encryption key memory associated with the communication bridge, for each unecrypted data block, encrypting the unencrypted data block using the corresponding pre-calculated encryption key to generate an encrypted data block and an authentication code block for the unencrypted data block, aggregating one or more encrypted data blocks into an encrypted data transmission, and generating an authenticated code corresponding to the encrypted data transmission based upon each of the authentication code blocks of each of the encrypted data blocks.

18 Claims, 8 Drawing Sheets

| Inbound Transaction Layer 230 | Outbound Transaction Layer 232 |
| --- | --- |
| Encryption Engine Layer 300 | Decryption Engine Layer 220 |
| Transmitting Data Link Layer 210 | Receiving Data Link Layer 212 |

DEVICE AND METHOD FOR LOW-LATENCY AND ENCRYPTED HARDWARE LAYER COMMUNICATION

TECHNICAL FIELD

The present implementations relate generally to encryption, and more particularly to low-latency and encrypted hardware layer communication.

BACKGROUND

Computing systems are increasingly complex and operate in increasingly diverse and unmanaged deployments and application scenarios. With increasingly broad deployment across use cases and computing ecosystems, computing systems can be at increasing risk of malicious communication from a wider array of potential sources and attack vectors. Preserving computing speed and efficiency while mitigating and eliminating a wide range of potentially malicious communication with the computing system is critical to continuing to scale and expand deployment of computing systems in beneficial uses.

SUMMARY

With computing systems operating in increasingly diverse environments and subject to correspondingly increasing security risks, maintaining both high performance and high security are critical to realizing wide deployment of high performance computing devices and systems. Various protocols aim to achieve these goals of high performance and high security. Example implementations are directed to providing high-performance and low-latency hardware layer communication between microprocessors and the like and memory devices and the like, over a communication bus. The communication bus can have one or more characteristics in common with PCI Express ("PCIe") and Compute Express Link ("CXL"), and can further provide a hardware-implementable encryption and decryption layer that maintains substantially the same communication speed and latency as unencrypted communication. Thus, a technological solution for low-latency and encrypted hardware layer communication is provided.

In one embodiment, a method of low-latency and encrypted hardware layer communication comprises calculating, by an encryption circuit of a communication bridge controller of a device, one or more pre-calculated encryption keys corresponding to one or more block encryptors of the encryption circuit, each block encryptor configured to use a corresponding pre-calculated encryption key to encrypt a corresponding unencrypted data block of a data transmission having one or more unencrypted data blocks, storing, by the encryption circuit, the one or more pre-calculated encryption keys in an encryption key memory associated with the communication bridge, for each unecrypted data block, encrypting, by the block encryptor corresponding to the unencrypted data block, the unencrypted data block using the corresponding pre-calculated encryption key to generate an encrypted data block and an authentication code block for the unencrypted data block, aggregating, by the encryption circuit, one or more encrypted data blocks into an encrypted data transmission, and generating, by the encryption circuit, an authenticated code corresponding to the encrypted data transmission based upon each of the authentication code blocks of each of the encrypted data blocks.

The method may further include obtaining at least one initialization value corresponding to the block encryptor, where the calculating the encryption key may further include calculating the encryption key based on the initialization value.

The initialization value may correspond to an array value at an initialization index of an initialization vector, and the calculating the encryption key may further include calculating the encryption key based on the array value.

Obtaining the calculated encryption key may include obtaining the calculated encryption key subsequent to the storing the calculated encryption key.

The method may further include generating the authenticated code block based on an authentication seed.

The method may further include generating the authenticated code block based on a previous authenticated block generated by a previous block encryptor, where the block encryptor may include a plurality of block encryptors including the previous block encryptor.

Encrypting the unencrypted data block by the calculated encryption key may further include performing an XOR operation on the unencrypted data block and the calculated encryption key to generate the encrypted data block.

The method may further include a method where the obtaining the calculated encryption key from the encryption key memory may include obtaining the calculated key in one clock cycle.

In another embodiment, a device for low-latency and encrypted hardware layer communication comprises an encryption key memory configured to store one or more pre-calculated encryption keys corresponding to one or more unencrypted data block of a data transmission having one or more unencrypted data blocks, and an encryption circuit coupled to the encryption key memory and configured to encrypt the one or more unencrypted data blocks using the one or more corresponding pre-calculated encryption keys, thereby generating for each unencrypted data block an encrypted data block and an authentication code block, generate an encrypted data transmission by aggregating each of the encrypted data blocks, and generate an authenticated code corresponding to the encrypted data transmission, based upon each of the authentication code blocks.

The block encryptor may be further operable to obtain at least one initialization value corresponding to the block encryptor, where the calculating the encryption key may further include calculating the encryption key based on the initialization value.

The device may further include an initialization vector memory operatively coupled to the block encryptor and operable to store an initialization vector including the initialization value.

The initialization value may correspond to an array value at an initialization index of an initialization vector, and the calculating the encryption key may further include calculating the encryption key based on the array value.

The block encryptor may be further operable to obtain the calculated encryption key subsequent to the storing the calculated encryption key.

The block encryptor may be further operable to generate the authenticated code block based on an authentication seed.

The block encryptor may be further operable to generate the authenticated code block based on a previous authenticated block generated by a previous block encryptor.

The device may further include an encryptor including the block encryptor and the previous block encryptor.

The block encryptor may include an initialization input and an authentication input, the previous block encryptor may include an initialization output and an authentication output, the initialization input is operatively coupled to the initialization output, and the authentication input is operatively coupled to the authentication output.

The block encryptor may be further operable to perform an XOR operation on the unencrypted data block and the calculated encryption key to generate the encrypted data block.

Obtaining the calculated encryption key from the encryption key memory may include obtaining the calculated key in one clock cycle.

The encryption key memory may comprise a first-in-first-out memory.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

The methods and systems described herein are directed to providing encryption and decryption pre-calculation to minimize the impact of computing encryption keys for transmissions passed at a hardware level between system processors, memory devices, and the like. Example implementations can include a low-latency hardware layer bridge having one or more characteristics in common with CXL, and can include one or more encryption and decryption components, processors, and the like operable at least partially in accordance with Integrity and Data Encryption ("IDE"). Thus, example implementations can include a standards-compatible high-speed hardware layer communication bridge with robust encryption, decryption, and security validation of transmissions over the hardware layer. The high-speed hardware layer communication bridge can thus include low-latency IDE-compatible hardware layer encryption security coupled with a high-speed standards-compatible communication bridge.

Example implementations can include a low-latency communication bridge including both hardware encryption and decryption components. These encryption and decryption components can be implemented as layers within the low-latency communication bridge, and can constitute at least part of a communication path through the bridge, from a processor to an application layer. Present implementations can include a low-latency communication bridge having a transmitting portion and a receiving portion, with each portion respectively including an encryption layer and a decryption layer interposed between a processor-side data link layer and an application-side transaction layer. Each of the encryption layer and the decryption layer can have a corresponding structure capable of supporting block level encryption and decryption of transmission through the bridge. Present implementations can further include block encryptors, and corresponding block decryptors, operable to cooperatively perform encryption and decryption of transmitted data in block-length subsets. The block length subsets can correspond to a maximum size block associated with a particular encryption or decryption operation (e.g., 128-bit AES).

Present implementations include block encryptors and block decryptors that can fetch pre-calculated encryption keys associated with the particular block, which can reduce or eliminate latency associated with calculating a block-level encryption key at the time of requested encryption or decryption of a transmission block, data, block, or the like. Latency can be advantageously reduced by pre-calculation of block-level encryption keys from 20 clock cycles or more to as low as a single clock cycle required to retrieve the pre-calculated encryption key. Thus, the embodiments herein can achieve low-latency and encrypted hardware layer communication.

Figure 1:
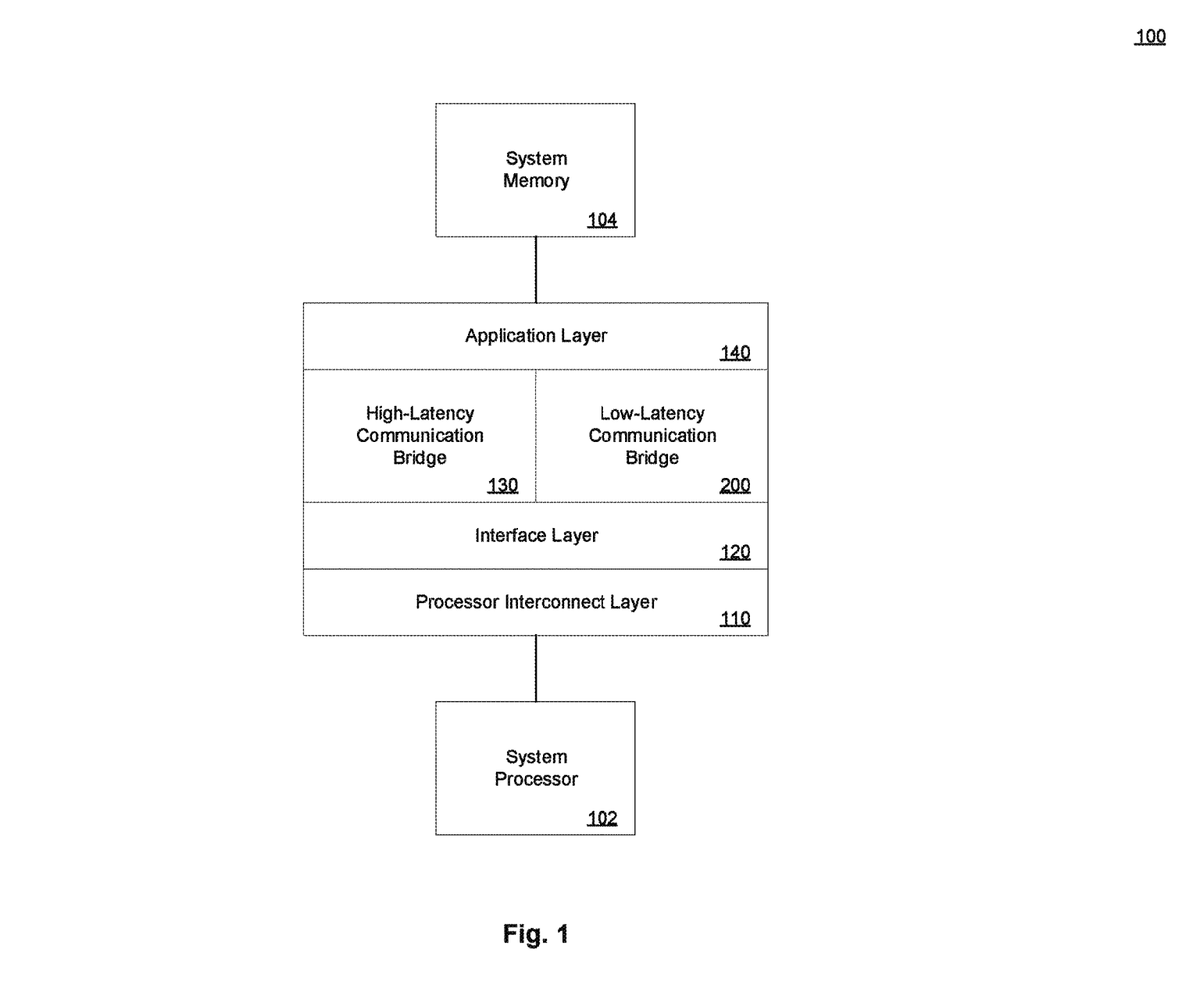
FIG. 1 illustrates a system, according to an embodiment.

FIG. 1 illustrates a system, in accordance with an embodiment. As illustrated by way of example in FIG. 1, a system 100 may include a system processor 102, a system memory 104, a processor interconnect layer 110, an interface layer 120, a high-latency communication bridge 130, an application layer 140, and a low-latency communication bridge 200. One or more of the processor interconnect layer 110, the interface layer 120, the high-latency communication bridge 130, and the application layer 140 can include one or more logical or electronic devices including but not limited to integrated circuits, logic gates, flip flops, gate arrays, programmable gate arrays, and the like.

The system processor 102 may be operable to execute one or more instructions associated with input from computing devices and systems external to the system processor 102. The system processor 102 may be an electronic processor, an integrated circuit, or the like including one or more of digital logic, analog logic, digital sensors, analog sensors, communication buses, volatile memory, nonvolatile memory, and the like. The system processor 102 may include but is not limited to, at least one microcontroller unit (MCU), microprocessor unit (MPU), central processing unit (CPU), graphics processing unit (GPU), physics processing unit (PPU), embedded controller (EC), or the like. The system processor 102 may include a memory operable to store or storing one or more instructions for operating components of the system processor 102 and operating components operably coupled to the system processor 102. The one or more instructions may include at least one of firmware, software, hardware, operating systems, embedded operating systems, and the like. It is to be understood that the system processor 102 or the system 100 generally can include at least one communication bus controller to effect communication between the system processor 102 and the other elements of the system 100.

The system memory 104 may be operable to store data associated with the system 100. The system memory 104 may include one or more hardware memory devices for storing binary data, digital data, or the like. The system memory 104 may include one or more electrical components, electronic components, programmable electronic components, reprogrammable electronic components, integrated circuits, semiconductor devices, flip flops, arithmetic units, or the like. The system memory 104 may include at least one of a non-volatile memory device, a solid-state memory device, a flash memory device, and a NAND memory device. The system memory 104 may include one or more addressable memory regions disposed on one or more physical memory arrays. A physical memory array may include a NAND gate array disposed on a particular semiconductor device, integrated circuit device, printed circuit board device, and the like.

The processor interconnect layer 110 may be operatively couplable to the system processor 102 and can provide a physical interconnect structure for coupling the system processor 102 to the interface layer 120. The processor interconnect layer 110 can include one or more physical connections, logical connections, or the like, to the system processor 102, and can further include one or more physical control structures, logical control structures, or the like operable to establish and maintain communication between the system processor 102 and the interface layer 120. The processor interconnect layer 110 can include electrical components, electronic components, and the like, operable to convert one or more electrical signals, digital signals, and the like, to corresponding input compatible with the interface layer 120.

The interface layer 120 may be operatively coupled to the processor interconnect layer 110, one or more of the high-latency communication bridge 130, and the low-latency communication bridge 200. The interface layer 120 can translate communication received from the system processor 102 to analog communication signals, digital communication signals, or the like, or any combination thereof, to corresponding signals compatible with one or more of the high-latency communication bridge 130 and the low-latency communication bridge 200. The interface layer 120 can selectably transmit communication between the system processor 102 and the system memory 104 by a selected high-latency communication bridge 130 or low-latency communication bridge 200, and can further select one of the high-latency communication bridge 130 and the low-latency communication bridge 200 in response to selection control from one or more of the system processor 102 and the system 100.

The high-latency communication bridge 130 may be operatively couplable to the interface layer 120 and the application layer 140, and can be compatible with a first hardware-layer communication protocol or the like, and can translate communication from the interface layer 120 and the application layer 140 bidirectionally. The high-latency communication bridge 130 can also lack communication security including encryption of transmission communication between the interface layer 120 and the application layer 140. The high-latency communication bridge 130 can be compatible with, correspond to, or the like, a PCI Express ("PCIe") communication bridge. It is to be understood that the PCIe bridge can lack encryption for transmitted communication, and can incur significant latency delays in response to integration of encryption for transmitted communication therewith or therein. Further, the high-latency communication bridge 130 can be optionally included in the system 100.

The application layer 140 may be operatively couplable to the high-latency communication bridge 130, the low-latency communication bridge 200, and the system memory 104. The application layer 140 can translate communication received from the system memory 104 to analog communication signals, digital communication signals, or the like, or any combination thereof, to corresponding signals compatible with one or more of the high-latency communication bridge 130 and the low-latency communication bridge 200. The application layer 140 can selectably transmit communication to and from the system memory 104 by a memory interface including one or more physical control structures, logical control structures, or the like operable to establish and maintain communication between the system memory 104 and the application layer 140. The application layer 140 can include electrical components, electronic components, and the like, operable to convert one or more electrical signals, digital signals, and the like, to corresponding input compatible with the system memory 104.

The low-latency communication bridge 200 may be operatively couplable to the interface layer 120 and the application layer 140, can be compatible with a second hardware-layer communication protocol or the like, and can translate communication from the interface layer 120 and the application layer 140 bidirectionally. The low-latency communication bridge 200 can also include communication security including encryption of transmission communication between the interface layer 120 and the application layer 140. For example, the low-latency communication bridge 200 can be compatible with, or the like, a Computer Express Link ("CXL") communication bridge. It is to be understood that the low-latency communication bridge 200 compatible with CXL can further include encryption for transmitted communication, and can avoid significant latency delays in response to integration of encryption for transmitted communication therewith or therein.

Figure 2:
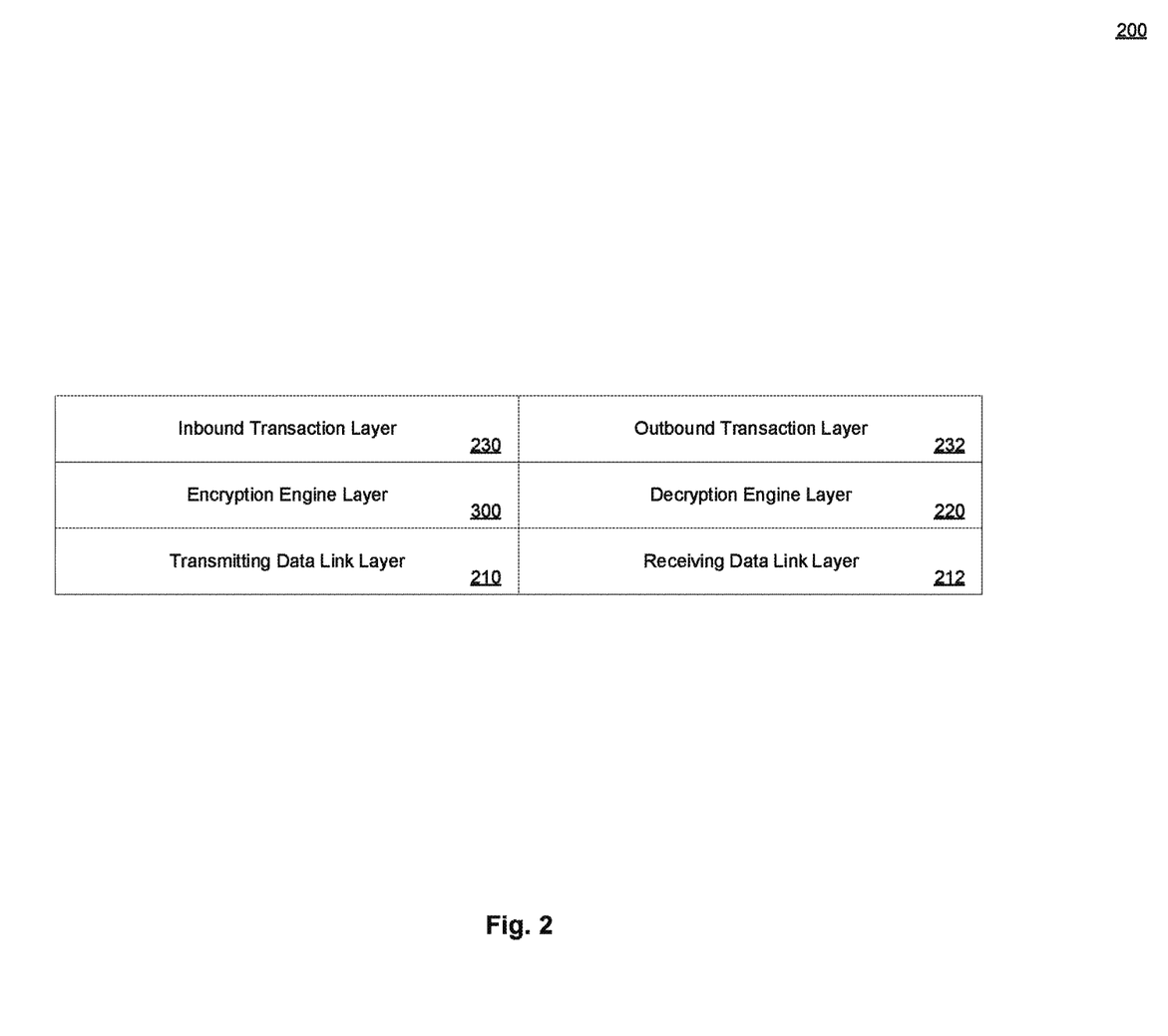
FIG. 2 illustrates a low-latency communication bridge further to the system of FIG. 1, according to an embodiment.

FIG. 2 illustrates a low-latency communication bridge further to the system of FIG. 1. As illustrated by way of example in FIG. 2, a low-latency communication bridge 200 may include a transmitting data link layer 210, a receiving data link layer 212, an encryption engine layer 300, a decryption engine layer 220, an inbound transaction layer 230, and an outbound transaction layer 232.

The transmitting data link layer 210 and the receiving data link layer 212 may be operable to communicate respectively with the encryption engine layer 300 and the decryption engine layer 220, and with the interface layer 120. The transmitting data link layer 210 and the receiving data link layer 212 can translate communications respectively transmitted to and received from the interface layer 120 in accordance with a communication protocol. The transmitting data link layer 210 and the receiving data link layer 212 can translate and transmit communication in accordance with CXL.

The encryption engine layer 300 may be operable to receive a transmission from the transmitting data link layer 210 and to generate a corresponding encrypted transmission. The encryption engine layer 300 can generate an encrypted transmission based on an unencrypted transmission received from the transmitting data link layer 210. The decryption engine layer 220 may be operable to receive a transmission from the outbound transaction layer 232 and to generate a corresponding decrypted transmission. The decryption engine layer 220 can operate correspondingly to the encryption engine layer 300 and can include corresponding structure thereto, in order to execute a decryption operation corresponding to the encryption operation executed by the encryption engine layer 300. The encryption engine layer 300 and the decryption engine layer 220 can execute corresponding symmetric encryption and decryption operations.

The inbound transaction layer 230 and the outbound transaction layer 232 may be operable to communicate respectively with the encryption engine layer 300 and the decryption engine layer 220, and with the application layer 140. The inbound transaction layer 230 and the outbound transaction layer 232 can translate communications respectively transmitted to and received from the application layer 140 in accordance with a communication protocol. The inbound transaction layer 230 and the outbound transaction layer 232 can translate and transmit communication in accordance with CXL.

Figure 3:
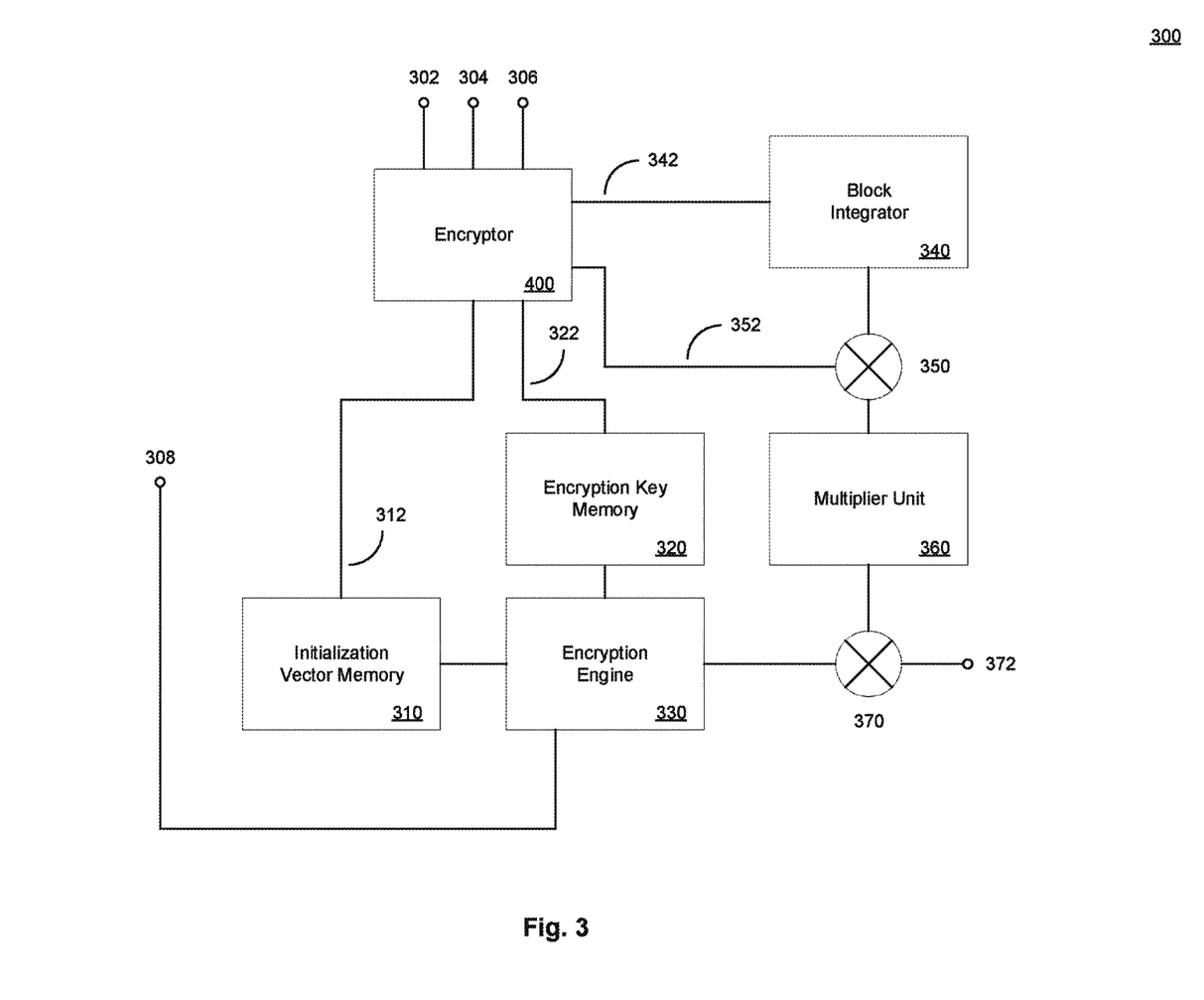
FIG. 3 illustrates an encryption engine layer further to the low-latency communication bridge of FIG. 2, according to an embodiment.

FIG. 3 illustrates an encryption engine layer further to the low-latency communication bridge of FIG. 2. As illustrated by way of example in FIG. 3, an encryption engine layer 300 may include an authentication seed input 302, an initialization index input 304, a data transmission input 306, a source encryption key input 308, an initialization vector memory 310, an initialization vector communication channel 312, an encryption key memory 320, an encryption key communication channel 322, an encryption engine 330, an encryptor 400, a block integrator 340, an encryptor output 342, a first logical operation block 350, an authentication code block output 352, a multiplier unit 360, a second logical operation block 370, and an authenticated code output 372.

The authentication seed input 302 may be operable to provide an authentication seed value to the encryptor 400. The authentication seed value can correspond to a scalar value, a hash, a randomly generated number, a predetermined number, or the like. The initialization index input 304 may be operable to provide an initialization index value to the encryptor 400. The initialization index value can correspond to a scalar value associated with a starting index of an initialization vector including a plurality of initialization values readable by the encryptor 400. The data transmission input 306 may be operable to provide one or more data transmissions to the encryptor 400. The data transmission input 306 can receive data transmissions from the transmitting data link layer 210. The source encryption key input 308 may be operable to provide a source encryption key to the encryption engine 330. The source encryption key can be compatible with, associated with, or the like, a particular encryption protocol or the like. The source encryption key can be compatible with 128-bit AES.

The initialization vector memory 310 may be operable to store at least one initialization vector associated with the encryptor 400. The initialization vector memory 310 can include one or more index locations, cells, or the like, corresponding to cells of an array ordered by index number. Each physical, logical, or like cell of the initialization vector memory 310 stores a particular initialization value transmittable to the encryptor 400. It is to be understood that the initialization vector memory 310 can include one or more logical or electronic devices including but not limited to integrated circuits, logic gates, flip flops, gate arrays, programmable gate arrays, and the like, and is not limited to a physical array structure. The initialization vector communication channel 312 may be operable to provide the initialization vector of the initialization vector memory 310 to the encryptor 400.

The encryption key memory 320 may be operable to store one or more calculated encryption keys. The encryption key memory 320 can store calculated encryption keys generated by the encryption engine 330. A length of the encryption key memory 320 can correspond to a number of calculated encryption keys that can be stored at the encryption key memory 320. As one example, an encryption key memory 320 having an array length of 20 can store 20 calculated encryption keys therein. A length of the encryption key memory 320 can vary based on application-specific requirements, and can advantageously be of any length sufficient to reduce or eliminate calculation delays at the encryptor 400 by eliminating run-time calculation of encryption keys and instead providing pre-calculated encryption keys to the encryptor 400. The encryption key memory 320 can have a length of 20 to eliminate a 20-clock cycle delay associated with generating a particular encryption key having a 20-clock cycle generation time. Thus, a pre-calculated encryption key can be retrieved in 1 clock cycle while constructing an encryption key consuming 20 clock cycles for a subsequent operation of the encryptor 400. The encryption key memory 320 is a first-in-first-out ("FIFO") memory in which the calculated encryption keys are stored and retrieved in FIFO order. The encryption key communication channel 322 may be operable to provide the one or more calculated encryption keys of the encryption key memory 320 to the encryptor 400.

The encryption engine 330 may be operable to generate one or more calculated encryption keys corresponding to one or more components, operations, and the like, of the encryptor 400. The encryption engine 330 can generate one or more calculated encryption keys at a time before the encryption key is requested by the encryptor 400, thus reducing or eliminating latency, delay, and the like associated with calculating an encryption key for a particular encryption operation at the time the encryption key is needed for a data transmission request. The encryption engine 330 can include one or more logical or electronic devices including but not limited to integrated circuits, logic gates, flip flops, gate arrays, programmable gate arrays, and the like.

The encryptor 400 may be operable to encrypt data transmission received from the data transmission input 306 and to generate an encrypted data transmission at the encryptor output 342. The encryptor 400 can include one or more logical or electronic devices including but not limited to integrated circuits, logic gates, flip flops, gate arrays, programmable gate arrays, and the like.

The block integrator 340 may be operable to receive one or more encrypted data blocks generated by the encryptor 400 and to combine the encrypted data blocks into an encrypted transmission. The block integrator 340 can append a sequence of encrypted data blocks into an encrypted data transmission in an order corresponding to the unencrypted data transmission.

The encryptor output 342 may be operable to provide an encrypted data transmission corresponding to an unencrypted data transmission received by the encryptor 400 at the data transmission input 306. The encryptor output 342 can also be provided to the outbound transaction layer 232, and can be transmitted to at least one of the application layer 140 and the system memory 104 in accordance with the intended destination of the encrypted transmission.

The first logical operation block 350 may be operable to generate a first validation object based on an authenticated code generated by the encryptor 400 and the encrypted data transmission generated by the block integrator 340. The first logical operation block 350 can perform a bitwise XOR operation of the authenticated code and the encrypted data transmission. The authentication code block output 352 may be operable to provide the authenticated code to the first logical operation block 350.

The multiplier unit 360 may be operable to generate a second validation object by a multiplication operation on the first validation object. It is to be understood that the multiplier unit 360 can perform any transformation operation on the first validation object to generate a validation object comparable to an output of the encryption engine 330. It is to be further understood that the multiplier unit 360 can be optionally included where the multiplier unit 360 can generate a second validation object comparable to a particular output of the encryption engine 330 with respect to a particular encryption protocol or the like.

The second logical operation block 370 may be operable to generate a third validation object based on the second validation object and an authentication object generated directly by the encryption engine 330. The second logical operation block 370 can perform a bitwise XOR operation of the second validation object and an authentication object generated directly by the encryption engine 330. The authenticated code output 372 may be operable to provide an authentication output result object to, for example, the system processor 102 or the low-latency communication bridge 200. In accordance with a determination that the authentication output result object and the authentication object generated directly by the encryption engine 330 do not correspond, match, or the like, operation of the or the low-latency communication bridge 200 can be modified or halted to prevent transmission of inauthentic data transmissions.

Figure 4:
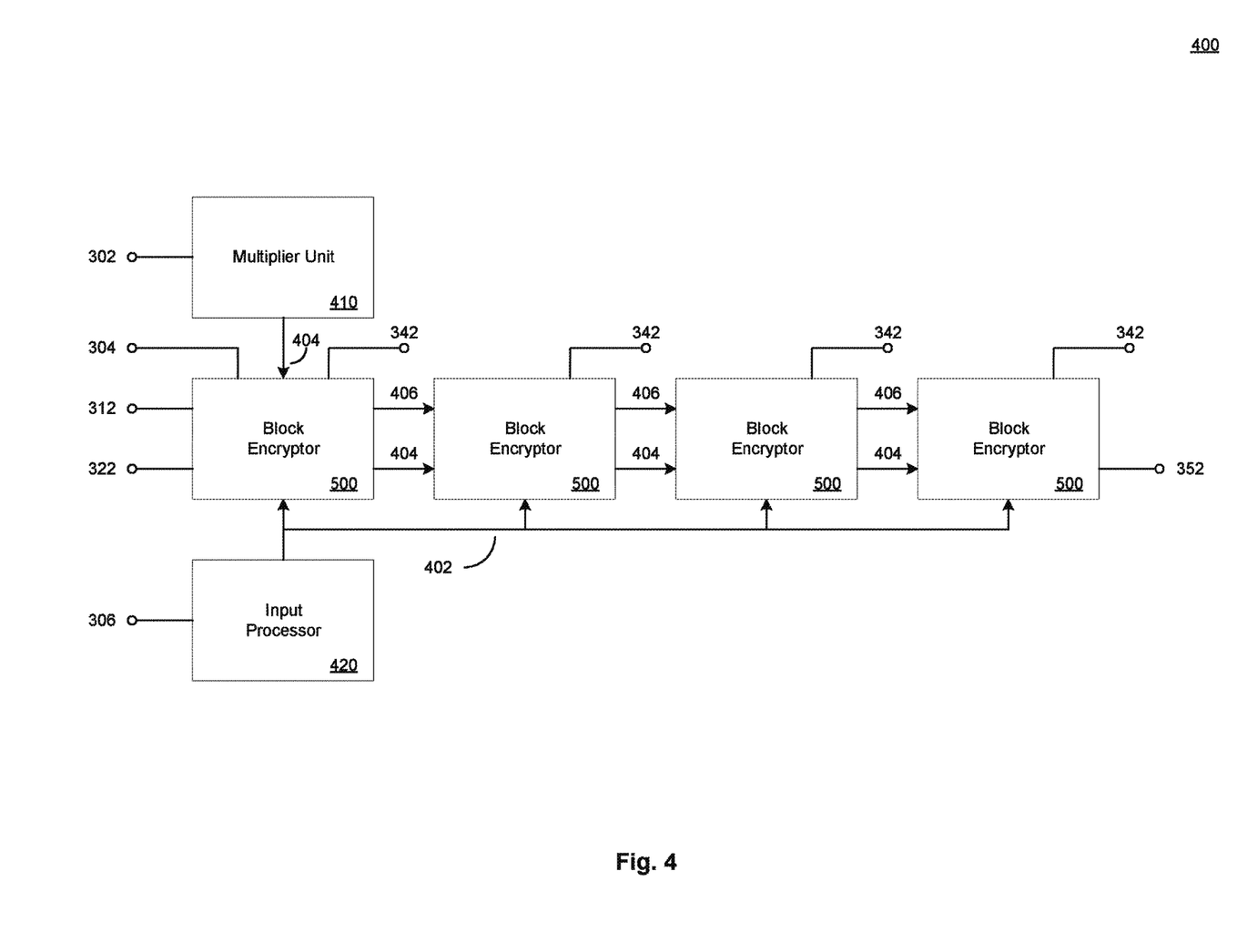
FIG. 4 illustrates an encryptor further to the encryption engine layer of FIG. 3, according to an embodiment.

FIG. 4 illustrates an encryptor further to the encryption engine layer of FIG. 3. As illustrated by way of example in FIG. 4, an encryptor 400 may include the authentication seed input 302, the initialization index input 304, the data transmission input 306, the initialization vector communication channel 312, the encryption key communication channel 322, the encryptor output 342, the authentication code block output 352, a data block communication channel 402, a cascading authentication input 404, a cascading initialization input 406, a multiplier unit 410, an input processor 420, and a plurality of block encryptors 500.

The cascading authentication input 404 may be operable to provide at least one authentication code block to a subsequent block encryptor 500 arranged in a cascade configuration therewith. The cascading authentication input 404 can provide at least an authentication output of a first or previous block encryptor 500 to a next or last block encryptor 500. For a first block encryptor 500 in a cascading sequence of block encryptors 500, the corresponding cascading authentication input 404 may be operable to receive an authentication seed or an authentication seed object derived from the authentication seed. The cascading initialization input 406 may be operable to provide at least one initialization index to a subsequent block encryptor 500 arranged in a cascade configuration therewith. The cascading initialization input 406 can provide at least an initialization index of a first or previous block encryptor 500 to a next or last block encryptor 500. For a first block encryptor 500 in a cascading sequence of block encryptors 500, the corresponding cascading initialization input 406 may be operable to receive an initialization index value from the initialization index input 304.

The multiplier unit 410 may be operable to generate an authentication seed object by a multiplication operation on the first validation object. It is to be understood that the multiplier unit 410 can perform any transformation operation on the authentication seed to generate an authentication seed object. It is to be further understood that the multiplier unit 410 can be optionally included where the multiplier unit 410 can generate an authentication seed object corresponding to a particular output of the encryption engine 330 with respect to a particular encryption protocol or the like.

The input processor 420 may be operable to divide the unencrypted data transmission into one or more data blocks respectively corresponding to and provided as input to corresponding ones of the block encryptors 500. The input processor divides the data transmission into one or more data blocks in an order corresponding to a cascades order of the block encryptors, to ensure that cascading encryption operations are performed on the data blocks in an order corresponding to an order to reassembly of the encrypted data blocks into an encrypted data transmission. The data block communication channel 402 may be operable to provide a data block to each of the block encryptors corresponding to at least a portion of the unencrypted data transmission. The block encryptors 500 may be operable to perform one or more encryption operations on one or more corresponding data blocks received at each respective block encryptor 500.

Figure 5:
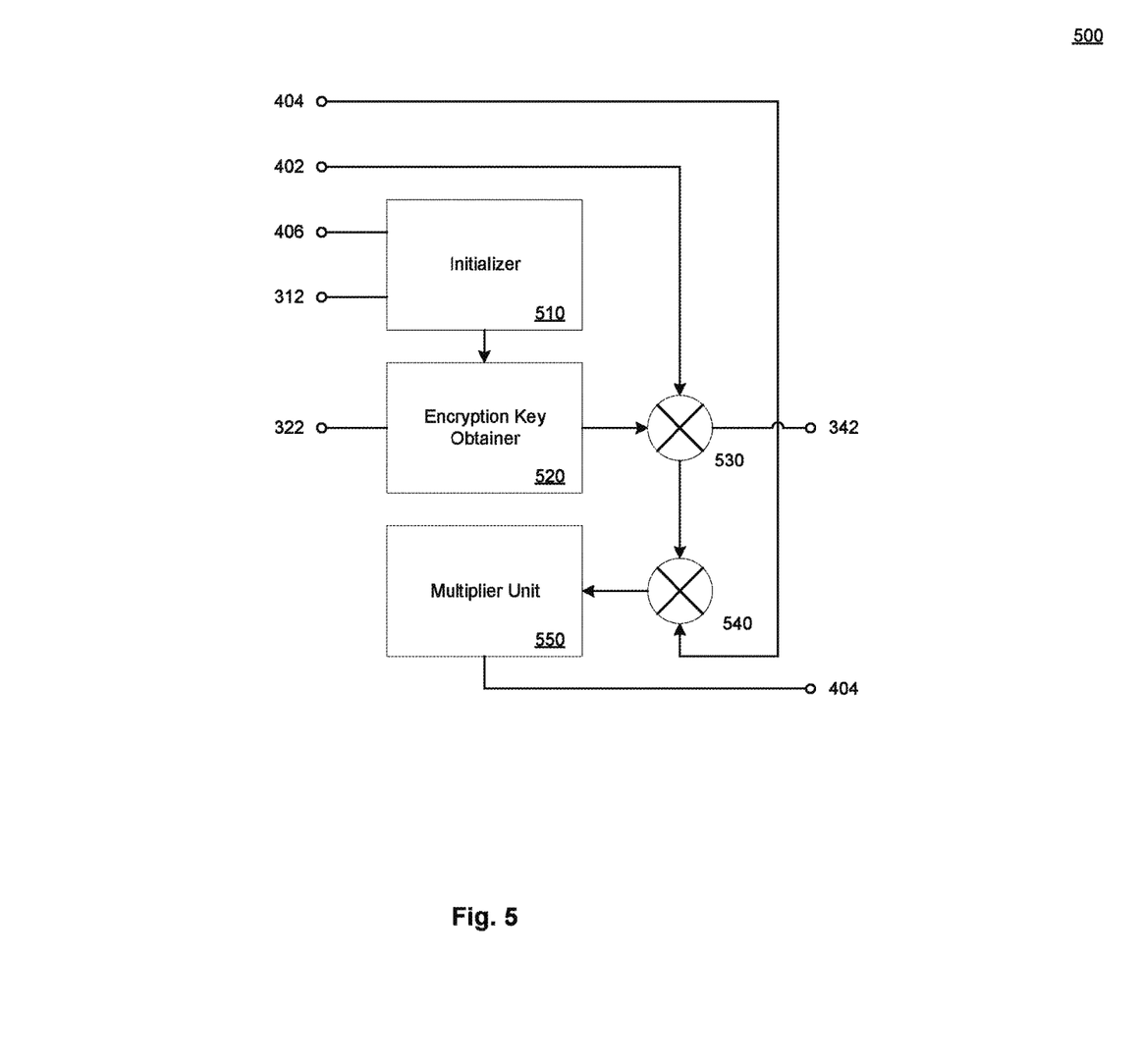
FIG. 5 illustrates a block encryptor further to the encryptor of FIG. 4, according to an embodiment.

FIG. 5 illustrates a block encryptor further to the encryptor of FIG. 4. As illustrated by way of example in FIG. 5, a block encryptor 500 may include the initialization index input 304, the initialization vector communication channel 312, the encryption key communication channel 322, the data block communication channel 402, the cascading authentication input 404, the cascading initialization input 406, an initializer 510, an encryption key obtainer 520, a multiplier unit 530, a first logical operation block 540, and a second logical operation block 550.

The initializer 510 may be operable to receive either an initialization index value from the initialization index input 304 or from the cascading initialization input 406. The initializer 510 can also receive the initialization vector from the initialization vector communication channel 312 and generate an initialization index value corresponding to the particular block encryptor 500 receiving the value. The initializer 510 can further increment the received initialization index value to correspond to its position in the cascade. For example, the initializer 510 of a first block encryptor can receive an initialization index value of 0, and can increment that value to 1. The initializer 510 can then obtain the array value at index 1 from the initialization vector to initialize the block encryptor 500 to the initialization value corresponding to that particular block encryptor 500. The first block encryptor 500 can then transmit the incremented initialization index value to the next block encryptor 500 for further incrementing. The initializer 510 can include one or more logical or electronic devices including but not limited to integrated circuits, logic gates, flip flops, gate arrays, programmable gate arrays, and the like.

The encryption key obtainer 520 may be operable to retrieve a calculated encryption key associated with the block encryptor 500. The encryption key obtainer 520 can obtain a calculated encryption key associated with the particular block encryptor in the cascade configuration, and can further obtain the calculated encryption key in accordance with an initialization index value generated by the initializer 510. The encryption key obtainer 520 can also obtain the calculated key in FIFO order, corresponding to a FIFO storage structure of the encryption key memory 320.

The first logical operation block 540 may be operable to generate a first validation object based on the calculated encryption key obtained by the encryption key obtainer 520 and the data block obtained from the data block communication channel 402. The first logical operation block 540 can perform a bitwise XOR operation of the calculated encryption key and the data block. The second logical operation block 550 may be operable to generate a second validation object based on the calculated encryption key obtained by the encryption key obtainer 520 and an authentication block obtained from the cascading authentication input 404. The second logical operation block 550 can perform a bitwise XOR operation of the calculated encryption key and the data block. The first logical operation block 540 and second logical operation block 550 can include one or more logical or electronic devices including but not limited to integrated circuits, logic gates, flip flops, gate arrays, programmable gate arrays, and the like.

The multiplier unit 530 may be operable to generate an authentication code block corresponding to the encrypted data block generated at the block encryptor 500, by a multiplication operation on the second validation object. It is to be understood that the multiplier unit 530 can perform any transformation operation on the second validation object to generate an authentication code block. It is to be further understood that the multiplier unit 530 can be optionally included where the multiplier unit 530 can generate an authentication code block corresponding to a particular output of the encryption engine 330 with respect to a particular encryption protocol or the like.

Figure 6:
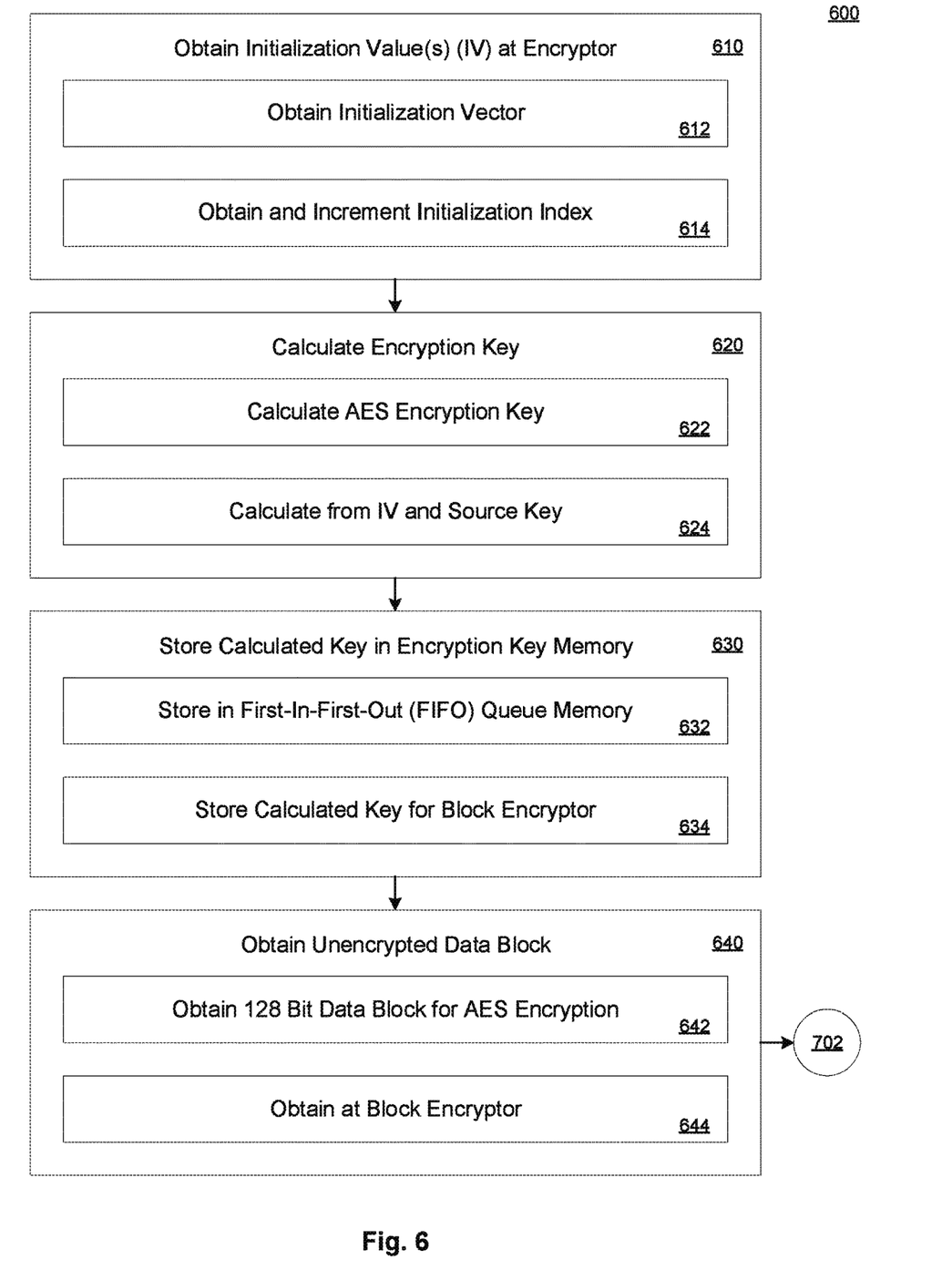
FIG. 6 illustrates a method of low-latency and encrypted hardware layer communication, according to an embodiment.

FIG. 6 illustrates a method of low-latency and encrypted hardware layer communication, in accordance an embodiment. At least one of the system 100, the low-latency communication bridge 200, and the encryption engine layer 300 may perform method 600. It is to be understood that the decryption engine layer 220 can perform decryption operations corresponding to encryption operations as presented by way of example in method 600.

At step 610, the system may obtain one or more initialization values at an encryptor. The initialization values can include one or more parameters, scalars, vectors, strings, and the like, including one or more constraints, instructions, or the like, to calculate an encryption key associated with the encryptor or any portion thereof. Step 610 may include at least one of steps 612 and 614. At step 612, the system may obtain at least one initialization vector. The initialization vector can include an array with one or more index-keyed array values. The array values of the initialization vector can be retrievable based on an array index or the like associated with one or more cells of the initialization vector. The array values can further include at least one seed value, random value, hardware value, unique identifier, or the like, associated with the encryptor or any portion thereof. The array values can correspond to corresponding individual block encryptors or groups thereof, and can provide block-specific initialization values. At step 614, the system may obtain and increments an initialization index. The initialization index can be a scalar value or the like associated with at least one encryptor or at least one block encryptor. The initialization index can be cascaded through multiple block encryptors and incremented at least block encryptor, in order to provide a sequential index value to each block encryptor in order. Thus, the incremented initialization index can provide an array value from the initialization vector in an order from the initialization vector to the block encryptors in an order corresponding to array values in the initialization vector. The method 600 then may continue to step 620.

At step 620, the system may calculate an encryption key. The encryption engine can calculate an encryption key corresponding to a particular block encryptor of the encryptor. The encryption key can be a calculated key derived, generated, or the like, from a source encryption key. The system can also correspondingly calculate a decryption key in accordance with step 620. Step 620 may include at least one of steps 622 and 624. At step 622, the system may calculate an AES encryption key. For example, the AES encryption key can be 128 bits. At step 624, the system may calculate the encryption key based on the initialization values and a source encryption key. The encryption key can be calculated based on an array value of the initialization vector, where the array value is selected based on the initialization index. The method 600 then may continue to step 630.

At step 630, the system may store a calculated key in an encryption key memory. The encryption key memory can store one or more calculated encryption keys for later use during an encryption operation at a corresponding one of the block encryptors. The encryption key memory can also store calculated decryption keys for operation on encrypted data packets, streams, and the like. The encryption key memory can store calculated encryption keys at a predetermined key-generation time prior to execution of bridge communication traffic. The encryption key memory can store calculated encryption keys during runtime for retrieval and execution later in runtime. Thus, during a particular clock cycle, the encryption key memory can supply a calculated key to a block encryptor, and substantially concurrently obtain a calculated key for a subsequent clock cycle. Step 630 may include at least one of steps 632 and 634. At step 632, the system may store the calculated key in a FIFO queue memory. The FIFO queue memory can substantially continuously obtain and store calculated encryption keys in FIFO order. At step 634, the system may store a calculated key corresponding to a particular block encryptor. As one example, a calculated key corresponding to a particular block encryptor can be generated and stored at the encryption key memory in accordance with an order of the block encryptors. Thus, where an encryptor may include, for example, four block encryptors, every fourth calculated encryption key can be associated with a particular one of the block encryptors. The first and fourth encryption keys can be associated with a first block encryptor, the second and fifth encryption keys can be associated with a second block encryptor, and so on. The method 600 then may continue to step 640.

At step 640, the system may obtain an unencrypted data block. The unencrypted data block can correspond to a packet, subset, partition, or the like, associated with a transmission at the low-latency communication bridge. The unencrypted data block can correspond in size to an encryption block size, capacity, or the like. It is to be understood that step 640 can correspondingly obtain an encrypted data block and correspondingly perform various decryption operations corresponding at least partially to the encryption operations associated with the unencrypted data block. Step 640 may include at least one of steps 642 and 644. At step 642, the system may obtain a 128 bit data block for AES encryption. The unencrypted data block can have a length of 128 bits, and can be encrypted by a 128 bit encryption protocol. The encryption protocol can include, but is not limited to AES. At step 644, the system may obtain the data block at a block encryptor. The block encryptor can obtain the data block selectably at a particular block encryptor, can obtain the unencrypted data block in accordance with a fixed hardware round robin assignment, or the like. The method 600 then may continue to step 702.

Figure 7:
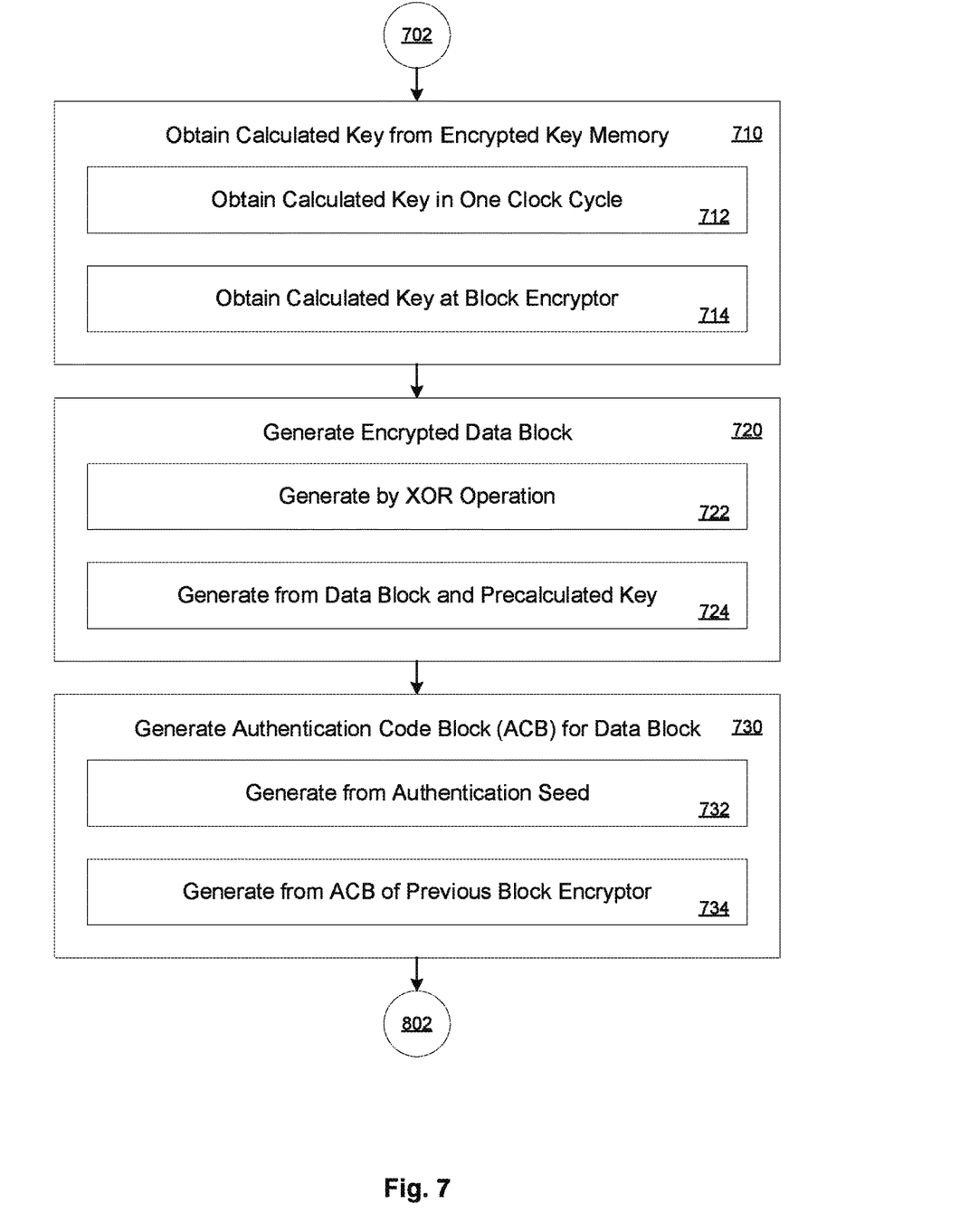
FIG. 7 illustrates a method of low-latency and encrypted hardware layer communication further to the method of FIG. 6, according to an embodiment.

FIG. 7 illustrates a method of low-latency and encrypted hardware layer communication further to the method of FIG. 6. At least one of the system 100, the low-latency communication bridge 200, and the encryption engine layer 300 may perform method 700. It is to be understood that that the decryption engine layer 220 can perform decryption operations corresponding to encryption operations as presented by way of example in method 700. The method 700 begins at step 702. The method 700 then may continue to step 710.

At step 710, the system may obtain a calculated key from the encrypted memory. Step 710 may include at least one of steps 712 and 714. At step 712, the system may obtain the calculated key in one clock cycle. The encryptor or the block encryptor can obtain the calculated encryption key in a single clock cycle, and can advantageously speed operation of the low-latency communication bridge 200 by preventing or eliminating a waiting period of multiple cycles while the encryption key associated with the block encryptor and the particular data block is calculated. At step 714, the system may obtain the precalculated key at a block encryptor. The encryptor or a particular block encryptor of the encryptor can obtain the calculated key advantageously to reduce or eliminate the time required to generate the encryption key by calculation at the time it is needed for encrypting of the data block. Further, the encryptor or the block encryptor can fetch a previously calculated encryption key and can thus advantageously reduce a significant number of clock cycles per encryption operation per block encryptor, to maintain low-latency communication speed with secure encryption of transmitted communications. The method 700 then may continue to step 720.

At step 720, the system may generate an encrypted data block. The encrypted data block can be generated by a block encryptor processing the particular data block. The block encryptor performing the encryption can also perform an encryption operation in accordance with a particular encryption operation. As one example, an encryption operation can correspond to, but is not limited to, 128-bit AES. It is to be understood that the data can also be decrypted in accordance with step 720, by a block decryptor, decryption key, and the like. Step 720 may include at least one of steps 722 and 724. At step 722, the system may generate the encrypted data block by an XOR operation. The XOR operation can perform a bitwise XOR operation on the data block and another input value having a corresponding number of bits to the data block. At step 724, the system may generate the encrypted data block from the data block and the precalculated key. The XOR operation can include the data block and the precalculated key, and can further include a bitwise XOR between one or more bits of the data block and one or more corresponding bits of the calculated encryption key. The method 700 then may continue to step 730.

At step 730, the system may generate at least one authentication code block corresponding to the encrypted data block. The authentication code block can correspond to, but is not limited to, a message authentication code (MAC) or the like. The authentication code block can be generated by the block encryptor generated the encrypted code block, and can provide a portion of an encryption validation message associated with the entire transmission corresponding to the data block and other data blocks at the block encryptor. It is to be understood that the authentication code block can also be extracted from an encrypted code block by a block decryptor in accordance with a decryption operation corresponding to the encryption operation of step 730. The authentication code block can be separated from the encrypted code block prior to generating an unencrypted code block. Step 730 may include at least one of steps 732 and 734. At step 732, the system may generate the authentication code block from an authentication seed. The block encryptors can be arranged in a cascade structure, in which the first block encryptor in the sequence can receive an authentication seed, because the first block encryptor can begin operation in the absence of receiving any previous authentication code block. At step 734, the system may generate the authentication code block corresponding to the encrypted data block from an authentication code block received from a previous block encryptor. The authentication code block of the previous block encryptor can be received as input at a subsequent block encryptor. The method 700 then may continue to step 802.

Figure 8:
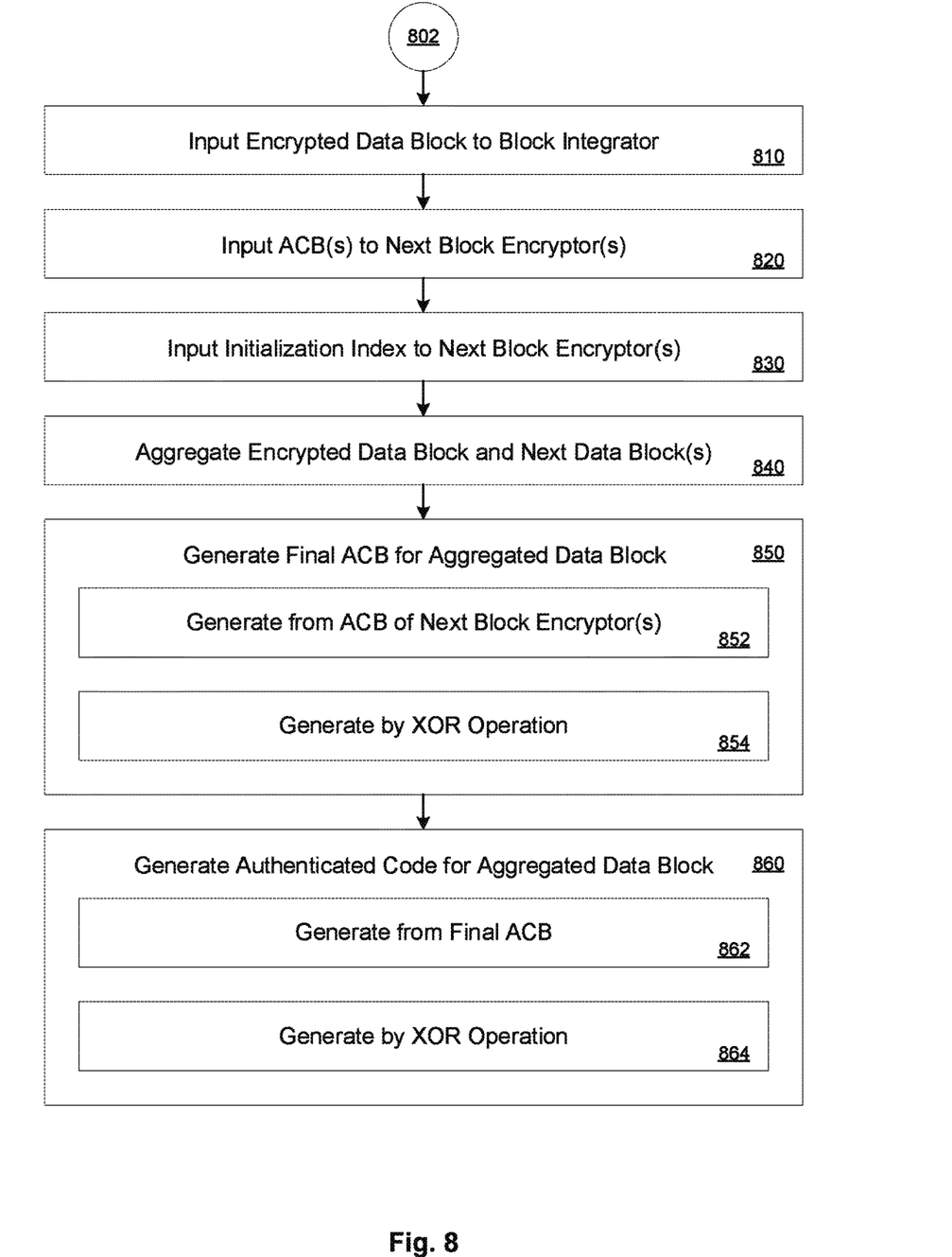
FIG. 8 illustrates a low-latency and encrypted hardware layer communication further to the method of FIG. 7, according to an embodiment.

FIG. 8 illustrates a low-latency and encrypted hardware layer communication further to the method of FIG. 7. At least one of the system 100, the low-latency communication bridge 200, and the encryption engine layer 300 may perform method 800. It is to be understood that that the decryption engine layer 220 can perform decryption operations corresponding to encryption operations as presented by way of example in method 800. The method 800 begins at step 802. The method 800 then may continue to step 810.

At step 810, the system may input an encrypted data block into a block integrator. The block integrator can receive data blocks from one or more block encryptors and can generate a data object including the received data blocks. It is to be understood that that the block integrator can also integrate unencrypted data blocks corresponding to decrypted data blocks. The method 800 then may continue to step 820.

At step 820, the system may input an authentication code block to one or more next block encryptors. The next block encryptors can be arranged in a cascade structure as discussed above to receive the authentication code block from the previous block encryptor in the cascade structure. The method 800 then may continue to step 830.

At step 830, the system may input the initialization index to the next block encryptors. The initialization index can be incremented in a cascade, with each block encryptor receiving the initialization index and subsequently incrementing initialization index after the receiving is complete. The method 800 then may continue to step 840.

At step 840, the system aggregates the encrypted data block and the next data blocks. The block integrator can aggregate multiple data blocks by appending or the like the data blocks in accordance with a particular order to correspond to a received unencrypted data block. The block integrator can append data blocks in an order received from the block encryptors. It is to be understood that that the block integrator can also integrate unencrypted data blocks corresponding to decrypted data blocks subsequent to a decryption operation. The method 800 then may continue to step 850.

At step 850, the system may generate a final authentication code block associated with the aggregated data block. The final authentication code block can be the authentication code block generated by the last block encryptor of the encryptor. The last block encryptor can have an authentication code block output not coupled to a next block encryptor, thus ending the cascade of authentication code block generation. Step 852 may include at least one of steps 852 and 854. At step 852, the system may generate the authentication code block from the authentication code blocks generated by the next block encryptors. The next block encryptors can be considered to include each block encryptor receiving its input from another block encryptor, thus including the last block encryptor and excluding the first block encryptor that can directly receive an authentication seed. At step 854, the system may generate the final authentication code block by an XOR operation. The XOR operation can correspond at least partially to the XOR operation of step 722. The method 800 then may continue to step 860.

At step 860, the system may generate an authenticated code for the aggregated data block. The authenticated code can be authenticated against a source encryption key of an encryption engine to validate the authenticated code, and thus to indirectly validate the aggregated data block. In the event that the authenticated code fails validation, the low-latency communication bridge can modify its operations to minimize transmission of inauthentic transmissions. As one example, low-latency communication bridge can cease operation, enter a safe mode including reduced communication functionality, can restrict or block transmission to one or more system processors, can restrict or block transmission to one or more system memories, and the like. Step 860 may include at least one of steps 862 and 864. At step 862, the system may generate the authenticated code from the final authentication code block. At step 864, the system may generate the authenticated code by an XOR operation. The XOR operation can correspond at least partially to the XOR operation of step 722. The method 800 may end at step 860.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "may include" should be interpreted as "may include but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim may include the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of low latency and encrypted hardware layer communication, the method comprising:
   calculating, by an encryption circuit of a communication bridge controller of a device, one or more pre-calculated encryption keys corresponding to one or more block encryptors of the encryption circuit, each block encryptor configured to use a corresponding pre-calculated encryption key to encrypt a corresponding unencrypted data block of a data transmission having one or more unencrypted data blocks;
   obtaining at least one initialization value corresponding to the block encryptor, wherein the calculating the pre-calculated encryption key further comprises calculating the pre-calculated encryption key based on the initialization value;
   storing, by the encryption circuit, the one or more pre-calculated encryption keys in an encryption key memory associated with the communication bridge;
   subsequent to the encryption circuit storing each pre-calculated encryption key into the encryption key memory, for each unencrypted data block:
   encrypting, by the block encryptor corresponding to the unencrypted data block, the unencrypted data block using the corresponding pre-calculated encryption key to generate an encrypted data block and an authentication code block for the unencrypted data block; aggregating, by the encryption circuit, one or more encrypted data blocks into an encrypted data transmission; and generating, by the encryption circuit, an authenticated code corresponding to the encrypted data transmission based upon each of the authentication code blocks of each of the encrypted data blocks.

2. The method of claim 1, wherein the initialization value corresponds to an array value at an initialization index of an initialization vector, and the pre-calculated encryption key is calculated based upon the array value.

3. The method of claim 1, wherein the obtaining the pre-calculated encryption key comprises obtaining the pre-calculated encryption key subsequent to the storing the calculated encryption key.

4. The method of claim 1, further comprising generating the authenticated code block based on an authentication seed.

5. The method of claim 1, further comprising:
   generating the authenticated code block based on a previous authenticated block generated by a previous block encryptor,
   wherein the block encryptor comprises a plurality of block encryptors including the previous block encryptor.

6. The method of claim 1, wherein the encrypting the unencrypted data block by the calculated encryption key further comprises:
   performing an XOR operation on the unencrypted data block and the pre-calculated encryption key to generate the encrypted data block.

7. The method of claim 1, further comprising obtaining the pre-calculated encryption key from the encryption key memory in one clock cycle.

8. A device for low latency and encrypted hardware layer communication, the device comprising:
   an encryption key memory configured to store one or more pre-calculated encryption keys corresponding to one or more unencrypted data blocks of a data transmission having one or more unencrypted data blocks; and
   an encryption circuit coupled to the encryption key memory and configured to:
   store the one or more pre-calculated encryption keys into the encryption key memory, the one or more pre-calculated encryption keys corresponding to block encryptor logic of the encryption circuit;
   wherein the block encryptor logic is further configured to:
   obtain at least one initialization value corresponding to the block encryptor logic, wherein the pre-calculated encryption key is calculated based on the initialization value;
   encrypt the one or more unencrypted data blocks using the one or more corresponding pre-calculated encryption keys and the corresponding block encryptor logic, thereby generating for each unencrypted data block an encrypted data block and an authentication code block;
   generate an encrypted data transmission by aggregating each of the encrypted data blocks; and
   generate an authenticated code corresponding to the encrypted data transmission, based upon each of the authentication code blocks.

9. The device of claim 8, further comprising: an initialization vector memory operatively coupled to the block encryptor logic and operable to store an initialization vector including the initialization value.

10. The device of claim 9, wherein the initialization value corresponds to an array value at an initialization index of an initialization vector, and the pre-calculated encryption key is further calculated based on the array value.

11. The device of claim 8, wherein the block encryptor logic is further configured to: obtain the pre-calculated encryption key subsequent to the encryption key circuit the pre-calculated encryption key.

12. The device of claim 8, wherein the block encryptor logic is further configured to:
   generate the authenticated code block based on an authentication seed.

13. The device of claim 8, wherein the block encryptor logic is further configured to:
   generate the authenticated code block based on a previous authenticated block generated by a previous block encryptor logic.

14. The device of claim 13, further comprising:
   an encryptor comprising the block encryptor logic and the previous block encryptor logic.

15. The device of claim 14, wherein the block encryptor logic comprises an initialization input and an authentication input, the previous block encryptor logic comprises an initialization output and an authentication output, the initialization input is operatively coupled to the initialization output, and the authentication input is operatively coupled to the authentication output.

16. The device of claim 8, wherein the block encryptor logic is further configured to:
   perform an XOR operation on the unencrypted data block and the pre-calculated encryption key to generate the encrypted data block.

17. The device of claim 8, wherein the pre-calculated encryption key is obtained from the encryption key memory in one clock cycle.

18. The device of claim 8, wherein the encryption key memory comprises a first-in-first-out memory.

* * * * *